US011263653B1

(12) United States Patent
Sumien et al.

(10) Patent No.: US 11,263,653 B1
(45) Date of Patent: Mar. 1, 2022

(54) COMMUNICATIONS SYSTEMS SUPPORTING TRANSACTIONAL PROMOTIONS THROUGH IN-FLIGHT ENTERTAINMENT SYSTEMS ONBOARD AIRCRAFT

(71) Applicant: Thales Avionics, Inc., Irvine, CA (US)

(72) Inventors: Maneesha Sumien, Mission Viejo, CA (US); Ammeeta Sanker, Singapore (SG); Sylvia Arndt, Long Beach, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 17/223,438

(22) Filed: Apr. 6, 2021

(51) Int. Cl.
 *G06Q 30/02* (2012.01)
 *H04N 21/214* (2011.01)
(52) U.S. Cl.
 CPC ..... *G06Q 30/0211* (2013.01); *G06Q 30/0237* (2013.01); *H04N 21/2146* (2013.01)
(58) Field of Classification Search
 CPC ...................................................... G06Q 30/02
 See application file for complete search history.

(56) References Cited

U.S. PATENT DOCUMENTS

| | | | | |
|---|---|---|---|---|
| 9,536,197 | B1* | 1/2017 | Penilla | G06F 3/147 |
| 10,636,046 | B2* | 4/2020 | Liu | G06Q 30/0203 |
| 10,713,675 | B2* | 7/2020 | Zafiroglu | G06Q 20/322 |
| 10,861,119 | B2* | 12/2020 | Keen | G06Q 30/0601 |
| 2002/0007306 | A1* | 1/2002 | Granger | G06Q 30/0266 |
| | | | | 705/14.55 |
| 2009/0094635 | A1* | 4/2009 | Aslin | H04N 21/812 |
| | | | | 725/32 |
| 2019/0012704 | A1* | 1/2019 | Lawrenson | G01C 21/3697 |
| 2019/0037372 | A1* | 1/2019 | Girard | H04W 12/02 |
| 2020/0068358 | A1* | 2/2020 | Macrae | H04N 21/214 |

FOREIGN PATENT DOCUMENTS

DE    102020110833 A1 * 10/2020    ............. G06Q 30/02

OTHER PUBLICATIONS

FlySensing: A case for crowsensing in the air (English), 2014 IEEE International Conference on Pervasive Computing and Communication Workshops (Percom Workshops) (pp. 545-550), Mar. 1, 2014 (Year: 2014).*

* cited by examiner

*Primary Examiner* — Marilyn G Macasiano
(74) *Attorney, Agent, or Firm* — Sage Patent Group

(57) ABSTRACT

A communications system supports transactions through seat video display units (SVDUs) and/or passenger electronic devices (PEDs) onboard aircraft. A ground-based server uploads to an aircraft server a set of promotions and associated criteria, where each criteria defines a condition that must be satisfied before transactions can be completed to obtain an associated one of the promotions. The ground-based server receives reports containing promotion usage metrics from the aircraft server, determines whether any of the criteria conditions are satisfied based on the promotion usage metrics, and when one of the criteria conditions associated with a satisfied one of the promotions is determined to be satisfied, sends a notification to the aircraft server that authorizes completion of the transactions for the satisfied one of the promotion. The vehicle server promotes the set of promotions and sends reports containing promotion usage metrics to the ground-based server.

23 Claims, 6 Drawing Sheets

COMMUNICATIONS SYSTEMS SUPPORTING TRANSACTIONAL PROMOTIONS THROUGH IN-FLIGHT ENTERTAINMENT SYSTEMS ONBOARD AIRCRAFT

TECHNICAL FIELD

Embodiments described herein relate generally to in-flight entertainment systems for aircraft and, more particularly, to communication protocols and operations for managing transactions related to promotions that are provided through in-flight entertainment systems during travel.

BACKGROUND

Promotions provided during in-flight entertainment ("IFE") can be linked to the content (e.g., movie, tv shows, documentaries, or video game) being hosted by the IFE. Airlines can be paid by promoters to embed a promotion in the content. For example, some video promotions may be shown on a display prior to displaying a movie or at specific times during the movie. Some airlines opt to display promotions as soon as a passenger accesses the IFE to guarantee that all passengers using the IFE, even those not starting a video program, will be shown a few promotions.

In an offline environment such as those aboard an aircraft, content has to be loaded in on-board servers before it can be served to passengers on television screens installed at their seats or streamed to their personal devices (e.g., smartphones, laptops, or tablets). The content may be prepared and loaded onto the on-board server every thirty to sixty days. Since the promotions may be linked with the content and the content may only be updated every thirty to sixty days, the promotions may become less relevant prior to being updated. For example, a promotion for a sporting event may still be advertised after the sporting event has been played.

SUMMARY

The following detailed description discloses various non-limiting example embodiments of the invention. The invention can be embodied in many different forms and is not to be construed as limited to the embodiments set forth herein.

Some embodiments are directed to a communications system for supporting transactions through seat video display units (SVDUs) and/or passenger electronic devices (PEDs) onboard passenger vehicles. The communications system includes a ground-based server and a vehicle server. The ground-based server uploads to the vehicle server a set of promotions and associated criteria, where each criteria defines a condition that must be satisfied before transactions initiated through one of the SVDUs and/or PEDs can be completed to obtain an associated one of the promotions. One of conditions requires at least a threshold number of transactions to be initiated by passengers for one of the promotions. The vehicle server receives the set of promotions and associated criteria from the ground-based server, and promotes the set of promotions to passenger graphic user interfaces, such as the SVDUs and/or the PEDS. The vehicle server generates promotion usage metrics based on receiving transactions initiated by passengers through the SVDUs and/or the PEDs requesting identified ones of the set of promotions. The vehicle server sends reports containing the promotion usage metrics to the ground-based server.

The ground-based server receives the reports and determines whether any of the criteria conditions are satisfied based on the promotion usage metrics, including whether the threshold number of transactions being initiated by the passengers for one of the promotions is satisfied. When a determination is made that one of the criteria conditions associated with one of the promotions is determined to be satisfied, the ground-based server sends a notification to the vehicle server that authorizes completion of transactions for the satisfied one of the promotions. The vehicle server receives the notification and responsively provides a promotion completion notification to each of the SVDUs and/or the PEDs from which transactions were initiated for the satisfied one of the promotions. In this manner, the passengers who participated can be made aware that the promotion has been satisfied.

Some other embodiments are directed a ground-based server that supports transactions on SVDUs and/or PEDs onboard passenger vehicles. The ground-based server uploads to a vehicle server a set of promotions and associated criteria, where each criteria defines a condition that must be satisfied before transactions initiated through one of the SVDUs and/or PEDs can be completed to obtain an associated one of the promotions. One of conditions requires at least a threshold number of transactions to be initiated by passengers for one of the promotions. The ground-based server receives reports containing promotion usage metrics from the vehicle server. The ground-based server determines whether any of the criteria conditions are satisfied based on the promotion usage metrics, including whether the threshold number of transactions being initiated by the passengers for one of the promotions is satisfied. The ground-based server sends a notification to the vehicle server that authorizes completion of transactions for the satisfied one of the promotions, when a determination is made that one of the criteria conditions associated with one of the promotions is determined to be satisfied.

Some other embodiments are directed to a vehicle server that supports shopping on SVDUs and/or PEDs onboard passenger vehicles. The vehicle server receives the set of promotions and associated criteria from the ground-based server. The vehicle server promotes the set of promotions to the SVDUs and/or the PEDS. The vehicle server generates promotion usage metrics based on receiving transactions initiated by passengers through the SVDUs and/or the PEDs requesting identified ones of the set of promotions. The vehicle server reports containing the promotion usage metrics to the ground-based server. The vehicle server receives a notification from the ground-based server which authorizes completion of transactions for the satisfied one of the promotions. The vehicle server responds to the notification by providing a promotion completion notification to each of the SVDUs and/or the PEDs from which transactions were initiated for the satisfied one of the promotions.

Numerous potential advantages can be provided by these and further embodiments disclosed herein. Potential advantages include removing the prior logistical constraints associated with offering and delivering promotions. Increased passenger interest in promotional items may be achieved by tempting passengers to make onboard purchases through a more interactive and engaging user interface and systems that provide dynamically changing promotions and the use of IFE functions to gamify the promotion and buying experience. The operations for promoting goods, services, and other items can provide a gamified experience for passengers, which can result in increased passenger engagement and may translate to an increase in onboard sales and associated revenue.

BRIEF DESCRIPTION OF THE DRAWINGS

Other features of embodiments will be more readily understood from the following detailed description of specific embodiments thereof when read in conjunction with the accompanying drawings in which.

DETAILED DESCRIPTION

Figure 1:
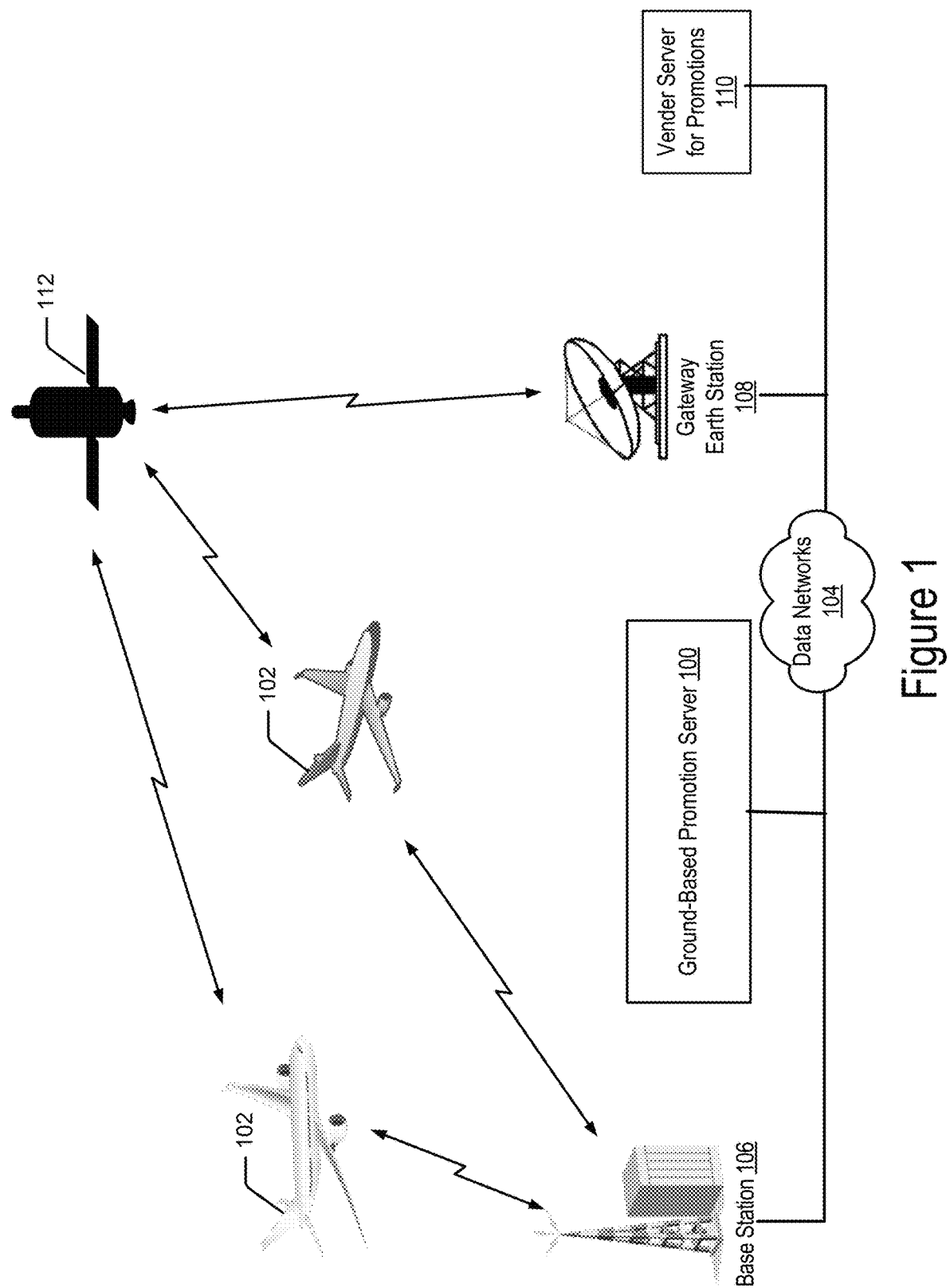
FIG. 1 illustrates ground-based and aircraft-based systems for providing promotions with defined criteria to passengers onboard the aircraft in accordance with various embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to creating, and delivering in a faster, more reliable way promotions for goods and/or services to passengers onboard aircraft or other vehicles. Various embodiments can be directed to increasing passenger interest in promotional items to tempt passengers to make onboard purchases through a more interactive and engaging user interface and dynamically changing promotions. The operations for promoting goods, services, and other items can provide a gamified experience for passengers, which can result in increased passenger engagement and may translate to an increase in onboard sales and associated revenue.

Although various embodiments are described in the context of promotional transactions provided through in-flight entertainment systems onboard aircraft, these and other embodiments are not limited thereto and can be used for other vehicles such as trains, ships, buses, other mass transport vehicles, ride share solutions, etc.

The notion of shopping promotions exists today and promotions are delivered onboard vehicles via traditional channels such as airline supplied shopping magazine onboard, promotional videos etc. These onboard promotions are paced by the frequency of shopping magazine updates (typically monthly, quarterly etc.) or content updates. Introducing new promotions amounts to delivering a new version of the shopping magazine (added printing, delivery and other logistical costs) or updating promotional content. Furthermore, conversion of such promotions to sales only happens if the passenger happens to browse to the promotions in the magazine. In case of promotions videos, if the passenger then decides to purchase after watching the video. All these traditional channels face similar challenges in that the vehicle passenger needs to discover the promotion, and decide to make a purchase based on enticement through the promotion. There are physical limitations (changing of medium and applications) to go from viewing the promotion to making a purchase. The intended emotion of enjoyment in participating in the promotion may be lost due to the time lag necessary to go from promotion viewing to being motivated to complete a separate transaction process required to obtain the promotion.

Various embodiments disclosed herein provide an improved process for generating, distributing, and completing transactions for promotions and shopping in a more dynamic, interactive and engaging manner for passengers who are onboard aircraft or other vehicles. Integration of the associated promotional operations into an onboard digital promotion platform facilitates the process from offer to transaction completion, and without possibly needing to involve cabin crew.

The promotions provided to passengers may be for goods and/or services that the passengers can purchase while onboard an aircraft or other vehicle. For example, a promotion may offer a product and/or service at a favorable price if a criteria condition that is associated with the promotion is satisfied. For example, a hotel at a flight destination may offer a discounted room rate for passengers if at least a threshold number of passengers agree to booking transactions for rooms under the promotion. In another example, a city tour or other service may be offered at the flight destination at a discounted rate for passengers if at least a threshold number of passengers agree to booking transactions for the service under the promotion. Similarly, a food, beverage, product, and/or digital content (e.g., movie, music, digital magazine, etc.) may be offered for delivery onboard the aircraft or at the destination if at least a threshold number of passengers agree to purchase transactions under the promotion.

However, if passengers fail to satisfy the criteria conditions of the promotion, passengers will still be given the opportunity to buy the item and or service at list price or at a lesser discount.

As will be explained in further detail below, some embodiments are directed to a ground-based promotion server that uploads to a vehicle-based promotion server a set of promotions and associated criteria which must be satisfied by passengers to complete a transaction for obtaining one or more of the promoted goods or services. Potential advantages of various embodiments also include adapting the concept of collective buying through promotions offered to passengers in a more real-time adaptive and engaging manner for passengers. Potential advantages may also include enabling easy redemption of promotions via an onboard promotion platform.

Various embodiments of the present disclosure are introduced with reference to FIG. 1, which illustrates ground-based and aircraft-based systems for providing promotions with defined criteria to passengers onboard the aircraft in accordance with various embodiments of the present disclosure.

Referring to FIG. 1, a vendor server 110 communicates through data networks 104 with a ground-based promotion server 100 to generate a set of promotions and associated criteria for distribution to various aircraft 102. Each criteria defines a condition that must be satisfied before transactions initiated through passenger electronic interfaces on the aircraft 102 can be completed to obtain an associated one of the promotions, wherein one of conditions requires at least a threshold number of transactions to be initiated by passengers for one of the promotions. The set of promotions and associated criteria can be uploaded to aircraft 102 via one or more gateway earth stations 108 and one or more satellites 112. Alternatively or additionally, the set of promotions and associated criteria can be uploaded to the aircraft 102 via direct air-to-ground communication (DA2GC) pathways through one or more base stations 106 (e.g., 4G or 5G radio base station).

Each aircraft 102 includes a vehicle server that receives the set of promotions and associated criteria from the ground-based promotion server 100, promotes the set of promotions through passenger electronic interfaces on the aircraft 102, generates promotion usage metrics based on receiving transactions initiated by passengers through the passenger electronic interfaces requesting identified ones of the set of promotions, and sends reports containing the promotion usage metrics to the ground-based promotion server 100 via the satellite communication pathway and/or the DA2GC pathway.

The ground-based promotion server 100 receives reports containing promotion usage metrics from the vehicle server, determines whether any of the criteria conditions are satisfied based on the promotion usage metrics, including whether the threshold number of transactions being initiated by the passengers for one of the promotions is satisfied. The ground-based promotion server 100 sends a notification to the vehicle server that authorizes completion of transactions for the satisfied one of the promotions when one of the criteria conditions associated with a satisfied one of the promotions is determined to be satisfied.

The vehicle server on each aircraft 102 which has one or more passengers who participated in the promotion that is satisfied, receives a notification from the ground-based promotion server 100 which authorizes completion of transactions for the satisfied one of the promotions. Responsive to the notification, the vehicle server provides a promotion completion notification to each of the passenger electronic interfaces from which transactions were initiated for the satisfied one of the promotions.

Some of the embodiments involve converting the notion of promotion presentation and conversion to a sale into a group shopping experience with conditions that provide a game-like experience. For example, a promotion can be made to appear more dynamic by limiting the promotion to an elapsing time period, to a relatively small range of participants (e.g., such as when more than X participants have agreed to purchase (also "subscribe") to the promotion it is unlocked but subsequently re-locked when Y participants have agreed), and other conditions that may appear to randomly or logically vary over time. The conditions may be logically defined to appear to passengers to create a promotional experience similar those experienced when playing games in order to motivate and engage users to participate in promotions offered onboard the aircraft.

Figure 2:
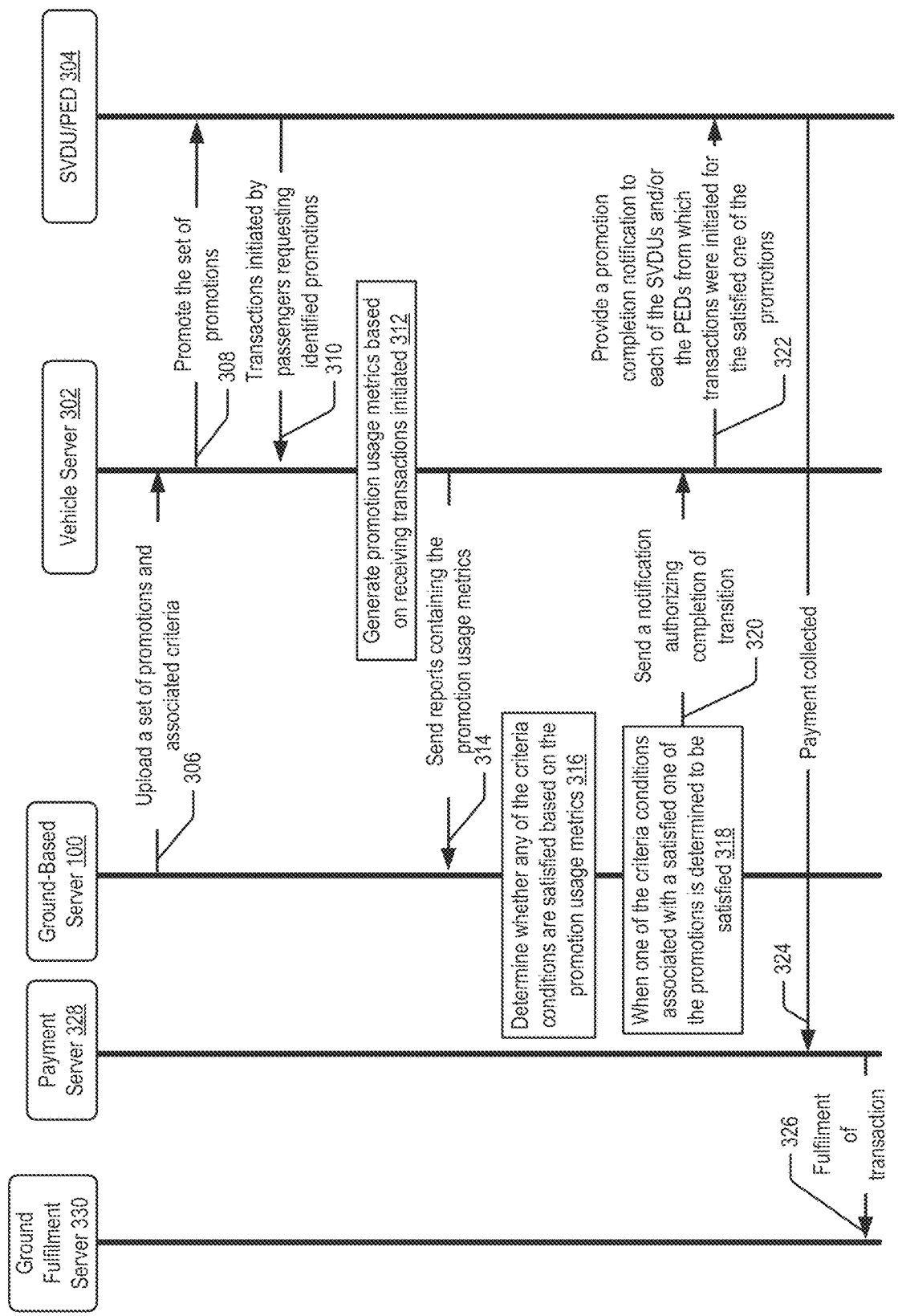
FIG. 2 illustrates a dataflow diagram of communications between ground-based and aircraft-based components which provide onboard promotions to passengers according to some embodiments of the present disclosure.

FIG. 2 illustrates a dataflow diagram of communications between ground-based and aircraft-based components which provide onboard promotions to passengers according to some embodiments of the present disclosure.

Referring to FIG. 2, a ground-based server 100 is configured to upload 308 to a vehicle server 302 a set of promotions and associated criteria. The set of promotions and associated criteria may be uploaded through a Messaging and Delivery Interface (MDI) to the vehicle server 302. Each of the criteria define a condition that must be satisfied before transactions initiated through passenger electronic interface, such as seat video display units (SVDUs) and/or passenger electronic devices (PEDs), can be completed to obtain an associated one of the promotions.

The vehicle server 302 is configured to receive 306 the set of promotions and associated criteria from the ground-based server 100. The vehicle server 302 promotes 308 the set of promotions through passenger graphic user interfaces (GUIs) which can be provided by the SVDUs and/or the PEDS 304.

For example, promotions may be delivered to each passenger (passenger GUI) or to selected ones of the passenger (e.g., passengers targeted based on known passenger data as described below) at their seat via an onboard common application services (CAS). The promotion(s) may be temporarily displayed for defined durations and/or moved between defined locations on a passenger GUIs (e.g., displayed at non-persistent locations). The set of promotions may be deleted from the vehicle server 302 responsive to operations to close a flight. The CAS may deliver a promotion link to passenger GUIs which may be selected by a passenger (e.g., touch selected) to trigger through the promotion link operations to be performed to provide promotional information and query the passengers to complete a transaction for obtaining the promotion. The promotional information may describe the promoted product and/or service and the associated criteria that must be satisfied, such as: a starting number of passengers who must participate in the promotion before the promotion can be satisfied; remaining number of passengers who still need to participate in the promotion before the promotion becomes satisfied; remaining time duration during which passengers can participate in the promotion; remaining number of passengers who are allowed to participate in the promotion; etc.

A passenger may initiate tracking of a promotion so that information is displayed on the passenger's GUI indicating how the criteria for the promotion are presently progressing toward becoming satisfied, such as how many more passengers still need to agree to participate in the promotion for it to become satisfied, how many remaining passengers are allowed to agree before further participation in the promotion is blocked, how much time remains before a promotion is closed, notification of when the promotion has become satisfied, etc. A passenger may subscribe to track any number of promotions being offered through the vehicle server 302.

A promotion may be displayed in a passenger GUI as a pop-up notification in a preset area of GUI with an option to opt-in for tracking updated information regarding criteria for the promotion, an option to opt-out of further notifications regarding the promotion, and/or an option to share a link for the promotion with other passenger on the aircraft, on another aircraft, and/or on the ground.

Passengers communicate through the SVDUs and/or the PEDs 304 with vehicle server 302 to initiate 310 transactions for one or more of the promoted promotions.

The vehicle server 302 generates 312 promotion usage metrics based on receiving transactions initiated by passengers through the SVDUs and/or the PEDs 304 requesting identified ones of the set of promotions. The vehicle server 302 sends 314 reports containing the promotion usage metrics to the ground-based server 100.

The promotion usage metrics may identify one or more of: a number of passengers who have initiated a transaction for a promotion by agreeing to the terms of the promotion (e.g., have provided payment information and agreed to payment if the promotion becomes satisfied); a number of passenger who have selected to opt out of participating in a promotion; a number of passengers who clicked a pop-up or other displayed promotion link to view the promotion; a number of passengers who have added a promotion to a virtual shopping cart; and a number of passengers who have been presented with a displayed promotion but who have not initiated an action to view details of the promotion or otherwise complete a transaction for the promotion.

The ground-based server 100 receives 314 the reports containing the promotion usage metrics from the vehicle server 302. The ground-based server 100 determines 316 whether any of the criteria conditions are satisfied based on the promotion usage metrics, including whether the threshold number of transactions being initiated by the passengers for one of the promotions is satisfied. The ground-based server 100 sends 320 a notification to the vehicle server 302 that authorizes completion of transactions for the satisfied one of the promotions, when a determination 318 is made that one of the criteria conditions associated with one of the promotions is determined to be satisfied.

The vehicle server 302 receives 320 the notification and responsively provides 322 a promotion completion notification to each of the SVDUs and/or the PEDs 304 from which transactions were initiated for the satisfied one of the promotions. In this manner, the passengers who participated can be made aware that the promotion has been satisfied.

The earlier transactions initiated 310 by the participating passengers may contain the passengers' payment information, e.g., credit card information, and authorization to automatically charge payment responsive to the promotion becoming satisfied, which can be provided to a payment server 328 to complete payment upon the promotion becoming satisfied. In the example of FIG. 2, the notification 322 queries the passengers to complete the transaction by providing payment information, which is then provided 324 to the payment server 328 to complete payment. The payment server 328 then notifies 326 a ground fulfilment server 330 to fulfil delivery of the promoted product and/or service to identified passengers who have completed payment. For example, a promoted product and/or service may be delivered on-board the aircraft, at an arrival terminal gate, or at an arrival terminal store and/or information for obtaining the promoted product and/or service may be provided to the participating passengers.

Alternatively, responsive to the promotion being satisfied, the vehicle server 302 may move the promoted product and/service to virtual shopping carts with notifications to the participating passengers to complete the necessary transactions.

An exemplary use case of the process may be directed to targeted onboard flash promotions. In this use case the flash promotions are targeted to passengers of the vehicle based on various data that has been collected associated with the passengers. The promotion would be sent to the targeted passenger via targeted advertisements. For example, those over 21 may receive a Wine&Spirits promotion. These targeted advertisements can be a pop-up notification with a click through feature. The promotion may also be a timed promotion with a "first come first serve" within a set period of time criteria for the promotion.

Another exemplary use case of the process may be directed to personalized onboard flash promotions. The personalized onboard flash promotions may be sent to a selected passenger via eCommerce integration with a recommendation engine, such as a machine learning algorithm. The selected passenger may be able to share the promotion with friends/family/business contacts on the ground via an application on an SVDU and/or PED or other connectivity, such as text messaging or email.

Another exemplary use case of the process may be directed to contextual onboard personalized flash promotions. Promotions may be selected for a passenger based on items or content viewed by a user on the SVDU and/or PED. The passenger may be able to share the promotion with onboard friends and family via seat-to-seat chat. The passenger may also be configured to be able to share the promotion with friends, family, business contacts on the ground via a companion app or other connectivity, such as text messaging or email.

Another exemplary use case of the process may be directed to personalized pre-flight flash promotions. The promotions may be sent to selected passenger via eCommerce integration with an app such as an airline's app. The passenger may be configured to be able to share available inventory with friends/family/contacts. The passenger friends/family/contacts are then able to request an item via direct link back into the airline app.

Figure 4:
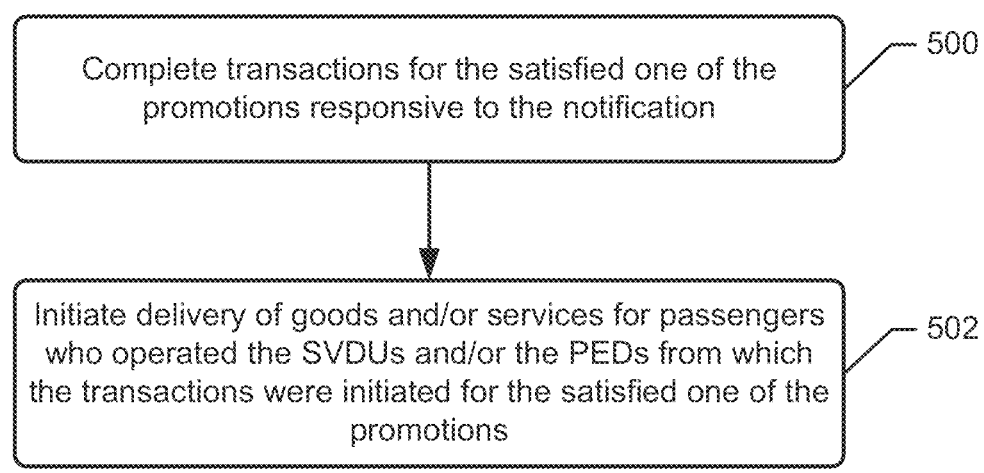
FIGS. 4 and 5 illustrate flowcharts of operations performed by a ground-based server in accordance with some embodiments of the present disclosure.

FIG. 4 illustrates a flowchart of operations that may be performed by the ground-based server 100 in accordance with some embodiments of the present disclosure. For example, following the determination at 318 in FIG. 2 that criteria for one of the promotions has become satisfied and the associated notification being sent, the ground-based server 100 can be configured to complete 500 transactions for the satisfied one of the promotions, and initiate 502 delivery of the promoted product(s) (good(s)) and/or services to the passengers who operated the SVDUs and/or the PEDs 304 from which the transactions were initiated for the satisfied one of the promotions. For example, a promoted product and/or service may be delivered on-board the aircraft, at an arrival gate, or at an arrival terminal store and/or information for obtaining the promoted product and/or service may be provided to the participating passengers.

Some further embodiments are directed to what triggers the vehicle server 302 of FIG. 2 to send 314 the reports containing the promotion usage metrics the ground-based server 100. In one embodiment, the vehicle server 302 sends reports containing the promotion usage metrics to the ground-based server 100 responsive to queries received from the ground-based server 100. Using queries from the ground-based server 100 to trigger reporting enables the ground-based server 100 to control how frequently the reports are sent. For example, when a promotion is being offered to passengers on a plurality of aircraft, the ground-based server 100 may increase the frequency of query-based reporting from the aircraft as the criteria for a promotion become close to being satisfied, e.g., within a threshold amount of being satisfied. This adaptation in the reporting frequency can decrease the satellite and/or DA2GC bandwidth utilized for reporting and enable more real-time tracking and determination of when promotion criteria become satisfied.

In another embodiment, the vehicle server 302 is configured to send reports containing the promotion usage metrics to the ground-based server 100 responsive to determining that a threshold reporting amount of any of the criteria conditions is satisfied based on the promotion usage metrics.

Accordingly, the vehicle server 302 can buffer the promotion usage metrics until, e.g., a threshold number of passengers have agreed to participate in a promotion. The threshold number may be changed over time as the criteria for satisfying a promotion becomes close. Again, this adaptation in the reporting frequency can decrease the satellite and/or DA2GC bandwidth utilized for reporting and enable more real-time tracking and determination of when promotion criteria become satisfied.

In some embodiments, the ground-based server 100 is configured to define the threshold reporting amount, and to send the threshold reporting amount to the vehicle server 302. The vehicle server 302 is configured to receive the threshold reporting amount from the ground-based server 100, and to adapt when it sends the reports containing the promotion usage metrics to the ground-based server 100 based on the threshold reporting amount.

Figure 5:
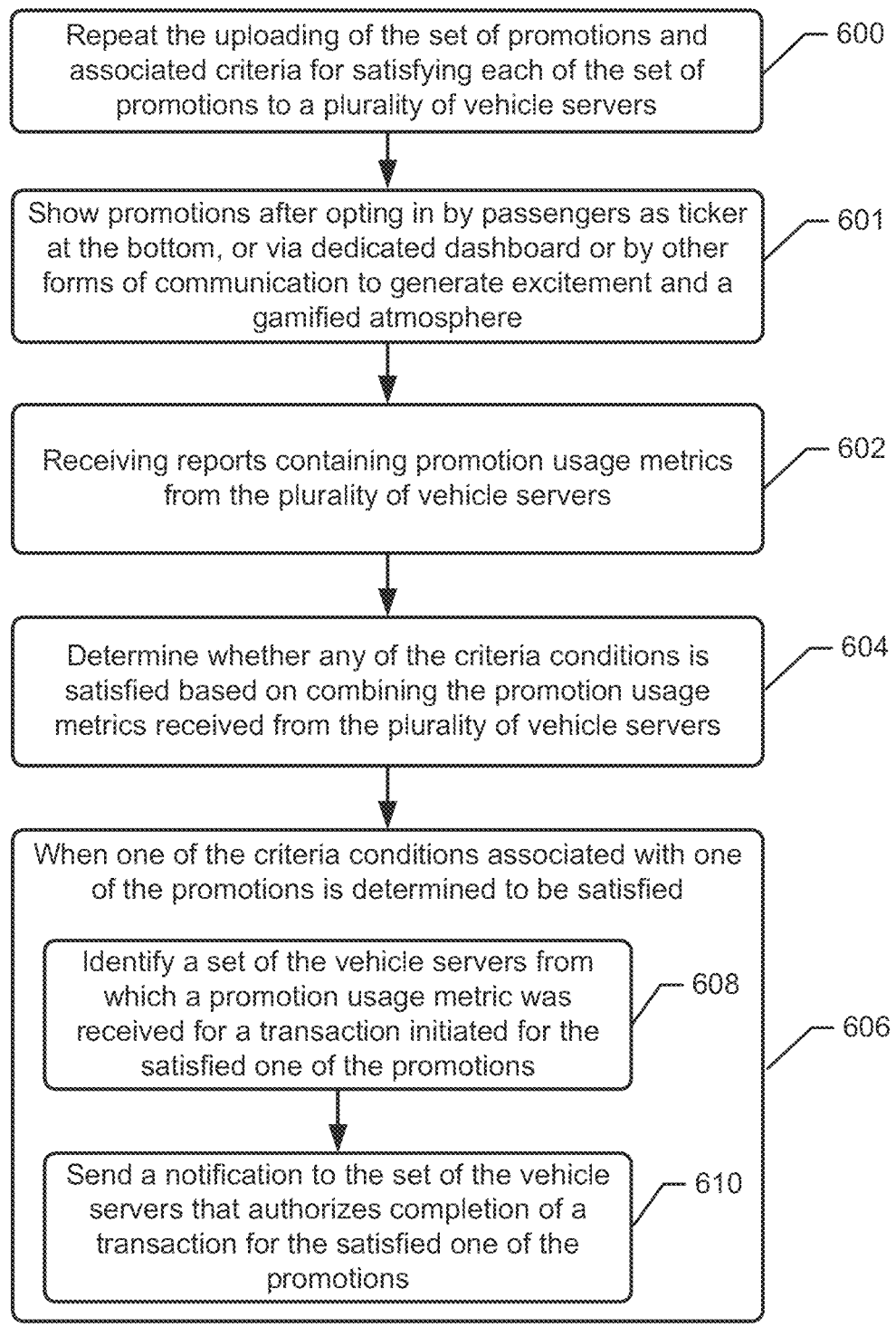

Promotions may be provided across multiple flights or vehicles in travel so that the groups of passengers can collectively participate in shared promotions. FIG. 5 illustrates a flowchart of operations performed by the ground-based server to provide promotions across multiple flights or vehicles in travel in accordance with some embodiments of the present disclosure. In some embodiments, the ground-based server 100 is further configured to repeat 600 the uploading of the set of promotions and associated criteria for satisfying each of the set of promotions to a plurality of vehicle servers. The ground-based server 100 is also configured to show 601 promotions after opting in by passengers as ticker at the bottom, or via dedicated dashboard or by other forms of communication to generate excitement and a gamified atmosphere. The ground-based server 100 is also configured to receive 602 reports containing promotion usage metrics from the plurality of vehicle servers 302. The ground-based server 100 determines 604 whether any of the criteria conditions is satisfied based on combining the promotion usage metrics received from the plurality of vehicle servers 302. The ground-based server 100 identifies 608 a set of the vehicle servers from which a promotion usage metric was received for transactions initiated for the satisfied one of the promotions when a determination is made 606 that one of the criteria conditions associated with one of the promotions is determined to be satisfied. The ground-based server 100 sends 610 a notification to the set of the vehicle servers 302 that authorizes completion of the transactions for the satisfied one of the promotions when 606 one of the criteria conditions associated with one of the promotions is determined to be satisfied.

In some embodiments, the ground-based server 100 and/or the vehicle server 302 controls how frequently the vehicle servers 302 of the plurality of aircraft report promotion usage metrics to the ground-based server 100. For example, the ground-based server 100 can control how much satellite bandwidth and/or DA2GC bandwidth is used for reporting. In one embodiment, the vehicle server 302 sends reports containing the promotion usage metrics to the ground-based server 100 responsive to determining that a threshold number of new transactions has been initiated for one of the promotions since a last report was sent. The ground-based server 100 is configured to adjust the threshold number based on a difference between a total number of transactions needed to satisfy one of the criteria conditions and a combined number of transactions that have been initiated for the one of the criteria conditions indicated by the promotion usage metrics received from the plurality of vehicle servers 302. The ground-based server 100 is also configured to send the threshold number to the plurality of vehicle servers.

The ground-based server 100 may be configured to decrease the threshold reporting amount based on a threshold decrease between the total number of transactions needed to satisfy one of the criteria conditions and the combined number of transactions that have been initiated for the one of the criteria conditions indicated by the promotion usage metrics received from the plurality of vehicle servers.

Figure 6:
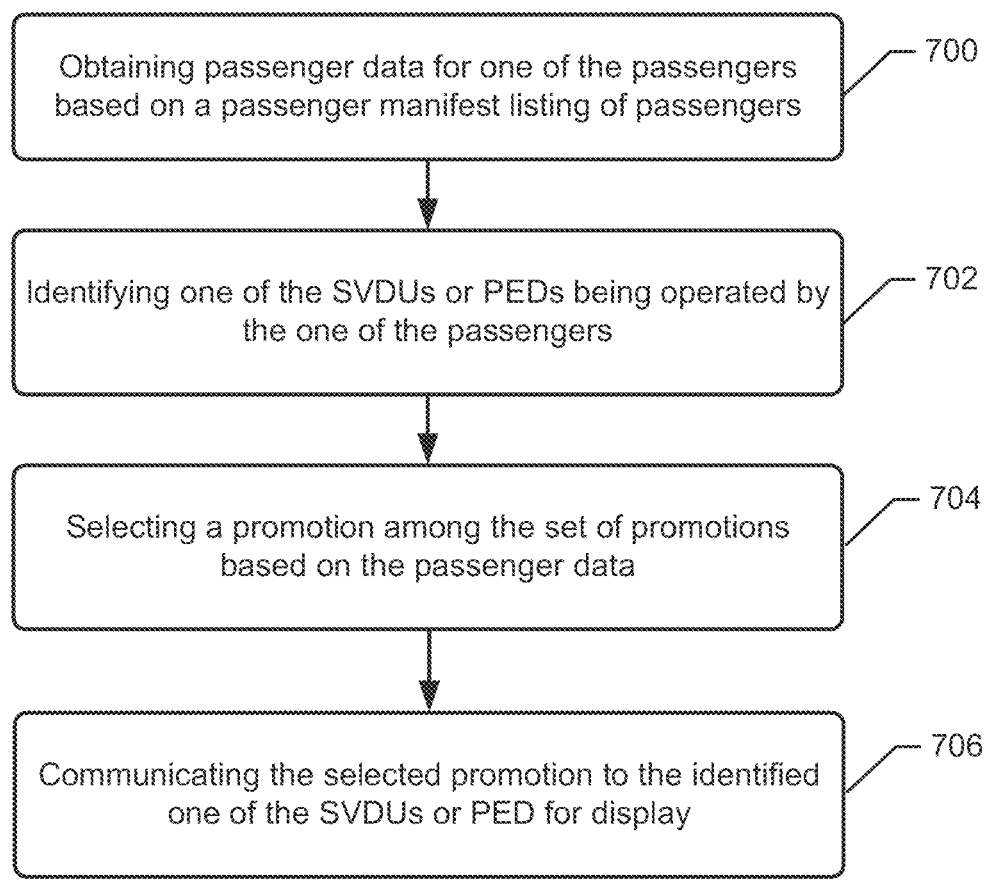
FIG. 6 illustrates a flowchart of operations performed by a vehicle server in accordance with some embodiments of the present disclosure.

FIG. 6 illustrates a flowchart of operations performed by the vehicle server 302 in accordance with some embodiments of the present disclosure. Referring to FIG. 6, the vehicle server 302 targets promotions to passengers operating specific SVDUs and/or PEDs 304 based on passenger data. The passenger targeted promotions may include obtaining 700 passenger data for one of the passengers based on a passenger manifest listing of passengers, and identifying 702 one of the SVDUs or PEDs being operated by the one of the passengers. The operations can include selecting 704 a promotion among the set of promotions based on the passenger data, and communicate 706 the selected promotion to the identified one of the SVDUs or PED for display.

In some embodiments, the promotions distributed to specific vehicle servers 302 are selected based on defined parameters, examples of which are explained below. The ground-based server 100 is further configured to select the set of promotions and define the associated criteria to be uploaded based on at least one of the following parameters: a predicted travel duration of the vehicle to a destination; the destination of the vehicle; an operator of the vehicle; list of specific passengers onboard the vehicle; demographics of specific passengers onboard the vehicle; status of specific passengers onboard the vehicle with an operator of the vehicle; remaining travel time of the vehicle; product inventory carried on the vehicle; and number of vehicles simultaneously participating in offering promotions to passengers onboard the vehicles.

In some embodiments, the criteria associated with a promotion is dynamically adjusted based on one or more parameters, examples of which are explained below. The ground-based server 100 is further configured to dynamically adjust a criteria associated with one of the promotions based on a present value of at least one of the following parameters: remaining travel time of the vehicle to a destination, numbers of passengers who have viewed the one of the promotions through SVDUs and/or PEDs 304, number of vehicles simultaneously participating in offering promotions to passengers onboard the vehicles, and total number of passengers carried on vehicles which are simultaneously participating in offering promotions to passengers. The ground-based server is also configured to upload the adjusted criteria to the vehicle server.

In some embodiments, the vehicle server 302 can select promotions among the set to be offered based on one or more parameters, examples of which are explained below. In some embodiments, the vehicle server is further configured to select among the set of promotions to be promoted to the SVDUs and/or the PEDs 304 based on at least one of the following parameters: a predicted travel duration of the vehicle to a destination; the destination of the vehicle; list of specific passengers onboard the vehicle; demographics of specific passengers onboard the vehicle; status of specific passengers onboard the vehicle with an operator of the vehicle; remaining travel time of the vehicle to the destination; and product inventory carried on the vehicle.

In some embodiments, the vehicle server 302 dynamically adjusts the criteria associated with the promotion based on one or more factors, examples of which are explained below. In some embodiments, the vehicle server 302 is further configured to dynamically adjust a criteria associated with one of the promotions based on a present value of at least one of the following parameters: remaining travel time of the vehicle to a destination; numbers of passengers who have viewed the one of the promotions through SVDUs and/or PEDs 304; number of vehicles simultaneously participating in offering promotions to passengers onboard the vehicles; and total number of passengers carried on vehicles which are simultaneously participating in offering promotions to passengers.

Figure 3:
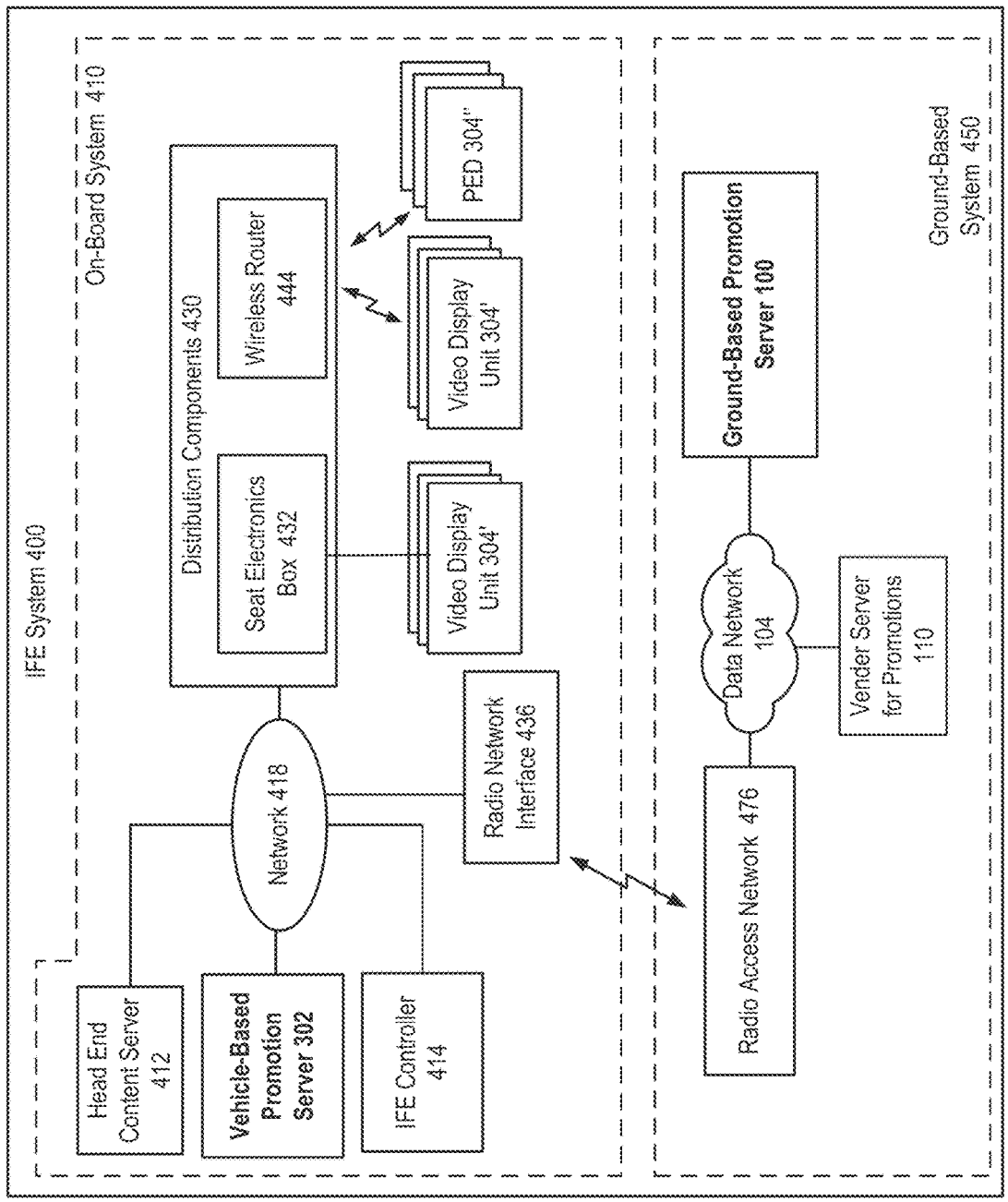
FIG. 3 illustrates a block diagram of some components of an in-flight entertainment ("IFE") system that includes an on-board system and a ground-based system which communicate with each other through satellites and/or DA2GC ground stations and are configured to operate in accordance with some embodiments of the present disclosure.

Example IFE System and Ground-Based System:

FIG. 3 illustrates a block diagram of some components of an in-flight entertainment ("IFE") system 400 that includes an on-board system 410 and a ground-based system 450 which communicate with each other through satellites and/or DA2GC ground stations and are configured to operate in accordance with some embodiments of the present disclosure.

Referring to FIG. 3, the on-board system 410 includes a head end content server 412, an IFE controller 414, a vehicle-based promotion server 302, and data distribution components 430 which are interconnected by networks 418. The distribution components 430 communicatively connect video display units 304' and passenger electronic devices ("PEDs") 304" to other components of the IFE system 400 through wired communication connections provided by seat electronic boxes 432 (e.g., each mounted to a row of seats) and/or through wireless communication connections provided by wireless routers 444 which can be spaced apart along the aircraft cabin. The wireless routers 444 may be WLAN routers (e.g., IEEE 802.11, WIMAX, etc.), cellular-based radio access points (e.g., a pico cell radio base station), etc.

The ground-based system 450 includes a ground-based promotion server 100 and a vendor server 110 which communicate through ground-based data networks 104 (e.g., Internet and/or private networks) and one or more radio access networks (RANs) 476 with the on-board system 410 through a radio network interface. The RAN(s) 476 may communicate through a satellite network and/or a DA2GC network. The head end content server 412 stores a set of electronic content (movies, games, music, electronic books and magazines, etc.) which it can deliver to the video display units 304' and/or the PEDs 304" responsive to content selection commands separately received from the video display units 304' and/or the PEDs 304".

A set of promotions and associated criteria can be uploaded from the ground-based promotion server 100 to the vehicle-based promotion server 302 for promotion to the passengers through GUIs provided by the video display units 304' and/or the PEDs 304" in accordance with one or more embodiments disclosed herein.

Any number of video display units 304', PEDs 304", and content servers 412 may be used with embodiments herein. Although the content server 412 is illustrated in FIG. 3 as being separate from the IFE controller 414, the functionality described herein for the content server 412 may alternatively or additionally be performed by the IFE controller 414. Although the vehicle-based promotion server 302 is illustrated in FIG. 3 as being separate from the IFE controller 414 and the head end content server 412, the functionality described herein for the vehicle server which receives and promotes promotions to passengers and sends reports containing the promotion usage metrics to the ground-based server, may alternatively or additionally be performed by the IFE controller 414 and/or the head end content server 412.

Although the system 410 of FIG. 3 includes a head end content server 412, other embodiments may not have a head end content server 412 that is separate from the video display units 304' and/or the PEDs 304". In other words, the video display units 304' and/or the PEDs 304" may be configured to store content in internal/local mass memory for access by users and/or may stream and/or download content from other devices, such as from off-board devices which can include the ground-based promotion server 100.

Further Embodiments and Definitions

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A communications system to support transactions on seat video display units (SVDUs) and/or passenger electronic devices (PEDs) onboard passenger vehicles, the communications system comprising:
 a ground-based server configured to:
  upload to a vehicle server a set of promotions and associated criteria, each criteria defining a condition that must be satisfied before transactions initiated through one of the SVDUs and/or PEDs can be completed to obtain an associated one of the promotions, wherein one of conditions requires at least a threshold number of transactions to be initiated by passengers for one of the promotions;
  receive reports containing promotion usage metrics from the vehicle server;
  determine whether any of the criteria conditions are satisfied based on the promotion usage metrics, including whether the threshold number of transactions being initiated by the passengers for one of the promotions is satisfied; and when one of the criteria conditions associated with a satisfied one of the promotions is determined to be satisfied, send a notification to the vehicle server that authorizes completion of the transactions for the satisfied one of the promotions; and the vehicle server configured to:
receive the set of promotions and associated criteria from the ground-based server;
promote the set of promotions to the SVDUs and/or the PEDS;
generate promotion usage metrics based on receiving transactions initiated by passengers through the SVDUs and/or the PEDs requesting identified ones of the set of promotions;
send reports containing the promotion usage metrics to the ground-based server;
receive a notification from the ground-based server which authorizes completion of the transactions for the satisfied one of the promotions; and
responsive to the notification, provide a promotion completion notification to each of the SVDUs and/or the PEDs from which transactions were initiated for the satisfied one of the promotions.

2. The communications system of claim 1, the ground-based server is further configured to:
responsive to the notification, complete transactions for the satisfied one of the promotions; and
initiate delivery of goods and/or services for passengers who operated the SVDUs and/or the PEDs from which the transactions were initiated for the satisfied one of the promotions.

3. The communications system of claim 1, wherein the vehicle server is configured to send reports containing the promotion usage metrics to the ground-based server responsive to queries received from the ground-based server.

4. The communications system of claim 1, wherein the vehicle server is configured to send reports containing the promotion usage metrics to the ground-based server responsive to determining that a threshold reporting amount of any of the criteria conditions is satisfied based on the promotion usage metrics.

5. The communications system of claim 4, wherein:
the ground-based server is configured to define the threshold reporting amount, and to send the threshold reporting amount to the vehicle server; and
the vehicle server is configured to receive the threshold reporting amount from the ground-based server, and to adapt when it sends the reports containing the promotion usage metrics to the ground-based server based on the threshold reporting amount.

6. The communications system of claim 1, wherein the ground-based server is further configured to:
repeat the uploading of the set of promotions and associated criteria for satisfying each of the set of promotions to a plurality of vehicle servers;
receiving reports containing promotion usage metrics from the plurality of vehicle servers;
determine whether any of the criteria conditions is satisfied based on combining the promotion usage metrics received from the plurality of vehicle servers; and
when one of the criteria conditions associated with one of the promotions is determined to be satisfied,
identify a set of the vehicle servers from which a promotion usage metric was received for transactions initiated for the satisfied one of the promotions, and
send a notification to the set of the vehicle servers that authorizes completion of the transactions for the satisfied one of the promotions.

7. The communications system of claim 6, wherein:
the vehicle server is configured to send reports containing the promotion usage metrics to the ground-based server responsive to determining that a threshold number of new transactions has been initiated for one of the promotions since a last report was sent; and
the ground-based server is configured to:
adjust the threshold number based on a difference between a total number of transactions needed to satisfy one of the criteria conditions and a combined number of transactions that have been initiated for the one of the criteria conditions indicated by the promotion usage metrics received from the plurality of vehicle servers; and
send the threshold number to the plurality of vehicle servers.

8. The communications system of claim 7, wherein the ground-based server is configured to:
decrease the threshold reporting amount based on a threshold decrease between the total number of transactions needed to satisfy one of the criteria conditions and the combined number of transactions that have been initiated for the one of the criteria conditions indicated by the promotion usage metrics received from the plurality of vehicle servers.

9. The communications system of claim 1, wherein the promoting of the set of promotions to the SVDUs and/or the PEDs by the vehicle server further comprises:
obtaining passenger data for one of the passengers based on a passenger manifest listing of passengers;
identifying one of the SVDUs or PEDs being operated by the one of the passengers;
selecting a promotion among the set of promotions based on the passenger data; and
communicating the selected promotion to the identified one of the SVDUs or PED for display.

10. The communications system of claim 1, wherein the ground-based server is further configured to:
select the set of promotions and define the associated criteria to be uploaded based on at least one of the following parameters:
a predicted travel duration of the vehicle to a destination;
the destination of the vehicle;
an operator of the vehicle;
list of specific passengers onboard the vehicle;
demographics of specific passengers onboard the vehicle;
status of specific passengers onboard the vehicle with an operator of the vehicle server;
remaining travel time of the vehicle;
product inventory carried on the vehicle; and
number of vehicles simultaneously participating in offering promotions to passengers onboard the vehicles.

11. The communications system of claim 1, wherein the ground-based server is further configured to:
dynamically adjust a criteria associated with one of the promotions based on a present value of at least one of the following parameters:

remaining travel time of the vehicle to a destination,
numbers of passengers who have viewed the one of the promotions through SVDUs and/or PEDs,
number of vehicles simultaneously participating in offering promotions to passengers onboard the vehicles, and
total number of passengers carried on vehicles which are simultaneously participating in offering promotions to passengers; and
upload the adjusted criteria to the vehicle.

12. The communications system of claim 1, wherein the vehicle server is further configured to:
select among the set of promotions to be promoted to the SVDUs and/or the PEDs based on at least one of the following parameters:
a predicted travel duration of the vehicle to a destination;
the destination of the vehicle;
list of specific passengers onboard the vehicle;
demographics of specific passengers onboard the vehicle;
status of specific passengers onboard the vehicle with an operator of the vehicle;
remaining travel time of the vehicle to the destination; and
product inventory carried on the vehicle.

13. The communications system of claim 1, wherein the vehicle server is further configured to:
dynamically adjust a criteria associated with one of the promotions based on a present value of at least one of the following parameters:
remaining travel time of the vehicle to a destination,
numbers of passengers who have viewed the one of the promotions through SVDUs and/or PEDs,
number of vehicles simultaneously participating in offering promotions to passengers onboard the vehicles, and
total number of passengers carried on vehicles which are simultaneously participating in offering promotions to passengers.

14. A ground-based server to support transactions on seat video display units (SVDUs) and/or passenger electronic devices (PEDs) onboard passenger vehicles, the ground-based server configured to:
upload to a vehicle server a set of promotions and associated criteria, each criteria defining a condition that must be satisfied before transactions initiated through one of the SVDUs and/or PEDs can be completed to obtain an associated one of the promotions, wherein one of conditions requires at least a threshold number of transactions to be initiated by passengers for one of the promotions;
receive reports containing promotion usage metrics from the vehicle server;
determine whether any of the criteria conditions are satisfied based on the promotion usage metrics, including whether the threshold number of transactions being initiated by the passengers for one of the promotions is satisfied; and
when one of the criteria conditions associated with a satisfied one of the promotions is determined to be satisfied, send a notification to the vehicle server that authorizes completion of the transactions for the satisfied one of the promotions.

15. The ground-based server of claim 14, further configured to:
complete transactions for the satisfied one of the promotions responsive to the notification; and
initiate delivery of goods and/or services for passengers who operated the SVDUs and/or the PEDs from which the transactions were initiated for the satisfied one of the promotions.

16. The ground-based server of claim 14, further configured to define the threshold reporting amount, and to send the threshold reporting amount to the vehicle server.

17. The ground-based server of claim 14, further configured to:
repeat the uploading of the set of promotions and associated criteria for satisfying each of the set of promotions to a plurality of vehicle servers;
receiving reports containing promotion usage metrics from the plurality of vehicle servers;
determine whether any of the criteria conditions is satisfied based on combining the promotion usage metrics received from the plurality of vehicle servers; and
when one of the criteria conditions associated with one of the promotions is determined to be satisfied,
identify a set of the vehicle servers from which a promotion usage metric was received for transactions initiated for the satisfied one of the promotions, and
send a notification to the set of the vehicle servers that authorizes completion of the transactions for the satisfied one of the promotions.

18. The ground-based server of claim 14, further configured to:
adjust the threshold number based on a difference between a total number of transactions needed to satisfy one of the criteria conditions and a combined number of transactions that have been initiated for the one of the criteria conditions indicated by the promotion usage metrics received from the plurality of vehicle servers; and
send the threshold number to the plurality of vehicle servers.

19. The ground-based server of claim 14, further configured to:
decrease the threshold reporting amount based on a threshold decrease between the total number of transactions needed to satisfy one of the criteria conditions and the combined number of transactions that have been initiated for the one of the criteria conditions indicated by the promotion usage metrics received from the plurality of vehicle servers.

20. The ground-based server of claim 14, wherein the ground-based server is further configured to:
dynamically adjust a criteria associated with one of the promotions based on a present value of at least one of the following parameters:
remaining travel time of the vehicle to a destination,
numbers of passengers who have viewed the one of the promotions through SVDUs and/or PEDs,
number of vehicles simultaneously participating in offering promotions to passengers onboard the vehicles, and
total number of passengers carried on vehicles which are simultaneously participating in offering promotions to passengers; and
upload the adjusted criteria to the vehicle.

21. A vehicle server to support shopping on seat video display units (SVDUs) and/or passenger electronic devices (PEDs) onboard passenger vehicles, the vehicle server configured to:
- receive the set of promotions and associated criteria from the ground-based server;
- promote the set of promotions to the SVDUs and/or the PEDS;
- generate promotion usage metrics based on receiving transactions initiated by passengers through the SVDUs and/or the PEDs requesting identified ones of the set of promotions;
- send reports containing the promotion usage metrics to the ground-based server;
- receive a notification from the ground-based server which authorizes completion of transactions for the satisfied one of the promotions; and
- responsive to the notification, provide a promotion completion notification to each of the SVDUs and/or the PEDs from which transactions were initiated for the satisfied one of the promotions.

22. The vehicle server of claim 21, further configured to send reports containing the promotion usage metrics to the ground-based server responsive to determining that a threshold number of new transactions has been initiated for one of the promotions since a last report was sent.

23. The vehicle server of claim 21, further configured to:
- dynamically adjust a criteria associated with one of the promotions based on a present value of at least one of the following parameters:
- remaining travel time of the vehicle to a destination,
- numbers of passengers who have viewed the one of the promotions through SVDUs and/or PEDs,
- number of vehicles simultaneously participating in offering promotions to passengers onboard the vehicles, and
- total number of passengers carried on vehicles which are simultaneously participating in offering promotions to passengers.

* * * * *